INVENTOR.
WILLIAM W. MEDLINSKI

United States Patent Office 3,275,917
Patented Sept. 27, 1966

3,275,917
RAPID CORRECTION MOTOR CONTROL SYSTEM OF STEADY STATE FLIGHT ERRORS
William W. Medlinski, Clifton, N.J., assignor to The Bendix Corporation, Teterboro, N.J., a corporation of Delaware
Filed Jan. 30, 1963, Ser. No. 255,008
9 Claims. (Cl. 318—18)

The invention relates to novel means for accomplishing rapid, proportional, automatic correction of steady state errors which may occur in automatic or semi-automatic flight control systems of an aircraft or missile and more particularly to an arrangement in which a bias correction may be effected without producing undesirable system instabilities by the provision of appropriate switching devices whereby the desired rapid bias correction may be achieved by the utilization of synchronizer-integrator and washout devices to effect the desired result.

An object of the invention is to provide a null sensor device so arranged as to operate suitable switching means in such a manner that a synchronizer signal is constantly supplied to maintain a control network of a synchronizer device in a balanced condition upon the controlled signal to a flight control system being zeroed or nulled for an extended period of time, and in which arrangement, under other operative conditions, a switching arrangement may be so actuated as to couple an integrator device to a polarity reversal device so as to apply a follow-up signal to the control signal in a flight control system.

Another object of the invention is to provide a null sensor device including means to filter undesirable null producing transients and further providing a proper null for appropriately delaying the desired switching action.

Another object of the invention is to provide a signal sensor device to sense deviations from a desired reference so arranged as to institute appropriate switching at some predetermined deviation from the reference in which the null sensing device may be accurately controlled and an arrangement in which suitable switching means may be operated by the signal sensing device so as to prevent the null sensing device from exerting any authority over its switching until a predetermined deviation from the reference is reached.

Another object of the invention is to provide novel means for effecting rapid, proportional, and automatic correction for steady state errors in an automatic or semi-automatic flight control system of an aircraft or missile.

Another object of the invention is to provide a novel means for effecting a bias correction in such automatic control without producing undesirable instabilities.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

Figure 1:
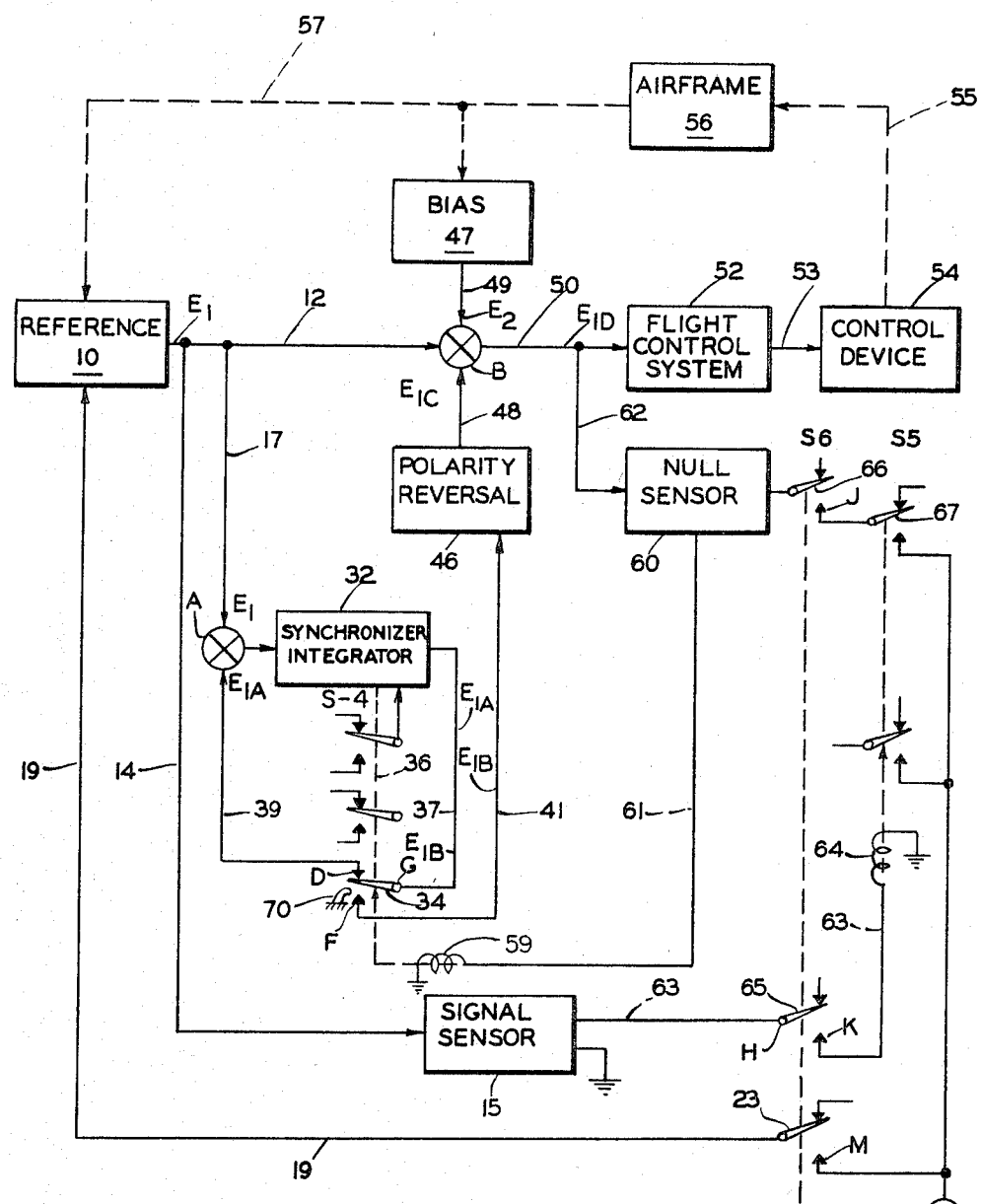
FIGURE 1 is a schematic diagram of a flight control system embodying the invention.

The present invention is directed to the provision of novel means for accomplishing rapid, proportional, and automatic correction for steady state errors which may occur in automatic or semi-automatic flight control systems, and an arrangement in which a bias correction may be accomplished without producing any undesirable system instabilities.

Heretofore, steady state error correction has been effected by utilizing integrating or wash-out devices. Thus, with this type of equipment, both integrating and wash-out devices produce similar undesirable system instabilities when the bias cancellation rates are relatively fast, so that in view of such undesirable system instabilities, the practical cancellation rates effected are relatively slow.

In such prior systems where sufficient time is available to complete the bias cancellation, slow rates of cancellation are not objectionable. However, in many such aircraft control systems, rapid bias cancellation is not only necessary, but the resultant system instability has been found to be very undesirable. Thus, for example, high speed aircraft and denser traffic conditions have significantly reduced the time available for cross wind (bias) correction during automatic instrument approaches on localizers and radio glide beams under operating conditions such as illustrated schematically in FIGURE 2.

The present invention provides novel means utilizing intelligence which is derived from certain characteristics common in most flight control systems. Thus, when two references conflict in the absence of bias-cancelling devices, the controlled airframe or missile will achieve a steady-state condition wherein a proportional error from both references exist.

However, in the utilization of such forms of intelligence, a cancellation null may be produced as the airplane achieves a steady-state condtion in which a corrective intelligence, necessary to achieve the desired reference is a signal equal in magnitude and of the same polarity as a displacement signal, and which corrective intelligence is also a signal equal in magnitude to a bias signal, and of the opposite polarity. Actually both the displacement and bias signals may be considered reference signals with the less predominant one being defined as a bias signal.

Before proceeding with an explanation of the disclosed invention, it is deemed desirable to define the following devices:

(1) Integrator
(2) Wash-out
(3) Synchronizer

As used herein, an integrator is a device which produces an output that is a time integral of the input and has memory. It is the function of the integrator device to integrate the reference signal and thereby produce an output signal which serves to cancel the bias signal.

A synchronizer device and a wash-out device may be considered identical devices with one exception; a synchronizer device has a much faster cancellation rate than a wash-out device. It is the function of the synchronizer device to rapidly compute and store an output signal proportional to the input signal while a wash-out device serves to accept biasing output signals and cancels these signals at a relatively slow rate.

Referring then to the drawing of FIGURE 1, the refer-illustrated a simple flight control system into which rapid bias cancellation has been incorporated. In stressing the functions and output relationship of the several elements illustrated in FIGURE 1, the electrical term "signal" and its properties will be used in lieu of the possibly more appropriate term "intelligence."

Referring the nto the drawing of FIGURE 1, the referenced device indicated by the numeral 10 may be a conventional electrical device for providing an output signal on the line 12 which is proportional to the displacement (deviation) from a desired reference value.

Figure 2:
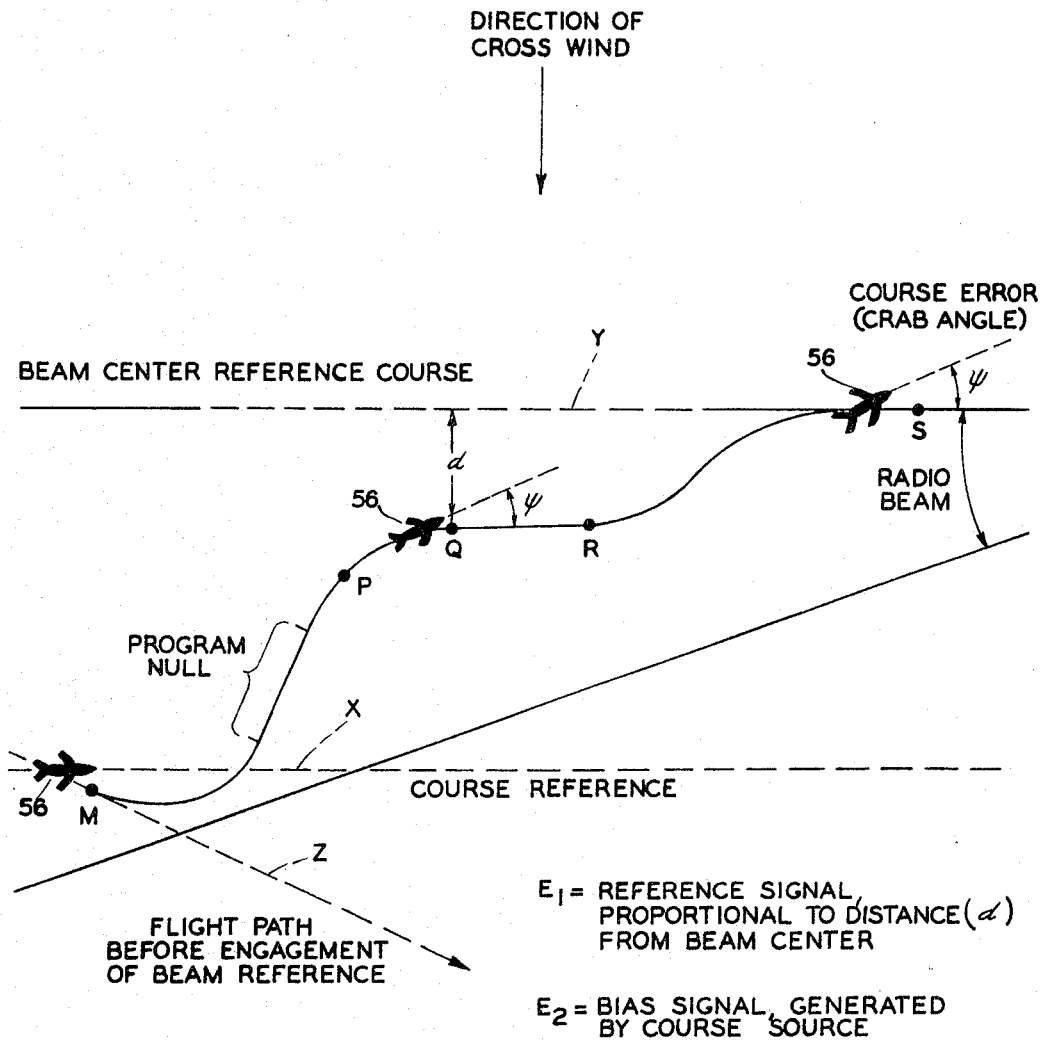
FIGURE 2 is a schematic diagram illustrating operation of the invention as applied to an aircraft in flight.

Thus, for example, the reference device 10 may be of a conventional type of electrical signal generating device such as a radio beam path signal receiver of conventional type for receiving signals from a ground based radio beam path transmitter. The receiver and signal generating device 10 being carried by a controlled aircraft or missile and arranged upon operative engagement to effect a reference signal $E_1$ proportional to distance ($d$) from a beam center reference Y, as shown in FIGURE 2, in response to the radio beam. The polarity of the signal $E_1$ applied to the line 12 of FIGURE 1 is correspondingly altered as the displacement from the beam center reference Y changes in sense. The signal $E_1$ is simultaneously applied to a line 14 for a signal sensor 15 and through a line 17 to a summing point A.

It may be noted that the reference device 10 has a control line 19 connected to a suitable source of electrical energy 21 controlled by a switch element 23 of a switch mechanism S–6. The arrangement is such that the reference device 10 will not generate controlling signals until the switch mechanism S–6 is actuated to a downward position so as to cause a switch element 23 to close a contact M to effectively energize the reference or signal generating device 10. The switch mechanism S–6 may be operated by a suitable operator-operative control member 27.

As shown diagrammatically in the drawing of FIGURE 1, the device 32 has been labelled a Synchronizer-Integrator Device, and for convenience this device has been illustrated as a device with two distinct identities, i.e. (1) a synchronizer and (2) an integrator.

In actual practice the device 32 may be of a conventional electro-mechanical type having the dual function of a synchronizer and an integrator such as that disclosed in co-pending U.S. application Ser. No. 459,245, filed May 27, 1965, by J. Doniger et al., and assigned to The Bendix Corporation, assignee of the present invention, or the device 32 may be two separate units, to wit, one unit being a synchronizer and the other unit being an integrator and which units may be selectively connected into operative relation. Reference herein to transition from a synchronizer device to an integrator device may include one unit having the double function of a synchronizer and an integrator or two separate synchronizer and integrator units of conventional type.

As illustrated in FIGURE 1, switch mechanism S–4 may be actuated to an upward position at which a switch element 34 connects contacts D and G, and in which the synchronizer-integrator device 32 is adjusted by an operative connection 36 of the switch mechanism S–4 so as to render the device 32 effective as a synchronizer for computing and storing intelligence.

Thus, when the signal $E_1$ applied to line 12 is other than zero, the device 32 will produce an output synchronizer signal $E_{1A}$ applied through the line 37, switch element 34 and line 39, and which output signal $E_{1A}$ is applied at the summing point A in opposition to the signal $E_1$ so as to tend to cancel the signal $E_1$ at summing point A. When the signal $E_1$ has been cancelled, the synchronizer device 32 ceases to produce any additional output. Thus, the signal $E_{1A}$ at point G is a repeat of the signal $E_1$ except for a polarity reversal.

When the switch mechanism S–4 is adjusted to a downward position so as to cause the switch element 34 to connect the contacts G and F, there is simultaneously effected through the operative connection 36 an adjustment of the synchronizer-integrator device 32, so that such device then operates to produce a slow inetgrator signal $E_{1B}$, the rate of which is such as not to cause objectionable system instabilities.

The adjustment of the switch element 34 so as to close contacts G and F causes the signal $E_{1A}$ heretofore applied by the device 32 as a reflection of the signal $E_1$ to be applied by the device 32 through the line 41 as a signal $E_{1B}$ in a value initially equal to that of the controlling signal $E_1$.

The device 32 then, in response to signal $E_1$ applied through the summing device A, produces an output signal $E_{1B}$ which is applied to the lines 37 and 41. The output signal $E_{1B}$ is proportional to the time integral of the signal $E_1$.

Moreover, when the switch mechanism S–4 is adjusted, as heretofore indicated, so that the switch element 34 connects contacts G and F, the output signal $E_{1B}$ is applied through a line 41 to a polarity reversal device 46 of conventional type. The polarity reversal device 46 receives the signal $E_{1B}$ from the inetgrator device 32 and supplies through an output line 48 an equal and opposite biasing signal $E_{1C}$ to a summing point B. The signal $E_{1C}$ acts in the same sense as signal $E_1$ applied to the summing point B through line 12 so as to effectively cancel an opposing biasing signal $E_2$ applied to summing point B by the bias signal device 47, and which signal $E_2$ is then substantially equal to the value of the signal $E_1$, as hereinafter explained. Although the polarity reversal device 46 is shown in FIGURE 1 as utilized with synchronizer-integrator 32, it should be noted that if separate synchronizer and integrator elements were used, the output of the separate integrator would not involve a polarity reversal and device 46 would be unnecessary.

The bias signal device 47 which, for example, may be a conventional compass signal device, is so arranged as to apply signal $E_2$ through a conductor 49 to the summing point B, which signal $E_2$ is generated by the bias signal device 47 in response, for example, to deviations of the aircraft or missile from a course reference, shown in FIGURE 2, which is parallel to the beam center reference Y. However, due to presence of crosswind, the actual flight path Z of the aircraft or missile is not parallel to the beam center reference Y.

Thus, the signal generated by the bias signal device 47 is in response to deviations from the course reference X and may well conflict with the signals generated in response to deviations for the beam center course reference Y. The bias device 47 produces biasing signal $E_2$ which may cause the aircraft, missile, or airframe 56 to assume a steady-state displacement from the desired reference value.

A conductor 50 leads from the summing point B to a flight control system 52 for the aircraft, missile, or airframe 56. The flight control system 52 responds to summation signals $E_{1D}$ applied to the conductor 50 from the summation point B and in response to these signals $E_{1D}$, the flight control system 52 supplies command signals through conductor 53 to a suitable flight control device 54 of conventional type for the aircraft, missile or airframe 56. The flight control system 52 is of conventional type and includes the necessary signal generating means to maintain other simultaneous flight references and may also include necessary facilities for limiting and modifying the summation signal $E_{1D}$ applied to line 50 from the summing point B.

The control device 54 may be of any conventional type of motivation means, human or otherwise, or suitable motor means which acts in accordance with the command signals supplied by the flight system 52. The control device 54 causes the airframe or body of the controlled aircraft or missile indicated generally by the numeral 56 to act in accordance with the command signals supplied by the flight control system 52.

The control device 54 may operate adjustable aileron elevators or adjustable control surfaces through suitable mechanical means 55 to change the controlled flight condition and/or attitude of the aircraft, missile or airframe 56 in such a manner as to eventually maintain the desired reference value in the radio beam response device 10, as indicated diagrammatically by the dotted line 57 of FIGURE 1. The airframe 56 is a vehicle whose flight conditions are to be controlled to the desired references, as shown in FIGURE 2.

The switch mechanism S–4 includes suitable switch elements, one of which is indicated by the numeral 34 and which switch elements are controlled or adjustably positioned by a solenoid 59 actuated by a signal from a null sensor device 60 coupled to solenoid 59 through a line 61. The null sensor device 60 exerts no authority over the switch element 34 until a predetermined decrease in the summation signal $E_{1D}$ applied through the control line 62 is effected as upon the sum of the signals at summing point B being zero (null) for a predetermined delay period. Thus, when a predetermined reference value is reached, as upon the aircraft being at the position Q of FIGURE 2, the null sensor device 60 is effective to actuate the switch element 34 so as to open contact D and close contact F, at which time suitable locking mechanism of conventional type indicated at 70 becomes effective to lock the switch element 34 in a position closing the contacts G and F. The delay period in the operation of the null sensor 60 serves to permit the null sensor 60 to filter undesirable transient fluctuations which might otherwise produce spurious nulls.

There is further provided a switch mechanism S-5 controlled by a solenoid 64 which is actuated by a signal from the signal sensor device 15 coupled to the solenoid 64 through switch element 65 and a line 63. Switch element 65 of the reference switch S-6 is actuated from the upper position shown to a position in which switch element 65 closes the switch contacts H and K by appropriate operation of the operator-operative control 27 so as to position the mechanically coupled switch elements 23, 65, and 66 from the upper position, shown to a lower position.

The switch mechanism S-6 is arranged to cause the switch element 65 to close contact K and also a switch element 66 to close a contact J connected to switch element 67 of a switch mechanism S-5 operable, as hereinafter explained, to bring into operation the null sensor device 60. The switch mechanism S-6 is also operable to cause the switch element 23 to close a contact M to operatively connect a source of electrical energy 21 to the condition responsive device 10 to render the same effective.

In the operation of the foregoing structure, shown in FIGURE 1, the following initial conditions may be assumed: (a) No signals are being generated by the signal reference device 10 as the switch element 23 is in the open position; nor are there any signals generated by the synchronizer-intergrator device 32, although a controlling signal may be generated by the bias device 47; (b) the airframe 56 under control of the bias device 47 may be maintaining a desired course reference X of FIGURE 2; (c) switch mechanisms S-4, S-5, and S-6 are in the positions illustrated in FIGURE 1; (d) the airframe 56 is not in a condition to maintain the reference value of the condition responsive device 10 until the device 10 is initially energized by the closing of switch 23; therefore, the reference device 10 will then generate a positive signal $E_1$ on the line 12 so as to tend to effect the beam center course reference Y, as hereinafter explained.

Thus, upon such operative engagement, the signal $E_1$ applied to line 14 by the radio beam responsive device 10 will cause signal sensor 15 to apply a signal through an operative connection including line connection 63 and close switch 65 to a solenoid 64. Upon the signal so applied decreasing below a predetermined value, the solenoid 64 is energized to actuate the switch mechanism S-5 to a closed position. The switch mechanism S-5 in normally biased by suitable spring means, not shown, to the open position shown.

In the operation of the system of FIGURE 1, the reference switch mechanism S-6 is closed by the operator-operative control 27 to initiate, for example, at course reference position M of FIGURE 2, operation of the additional airframe reference (the device 10) so as to provide a signal which may conflict with the already existing prime reference or the signal from the biasing device 47 to thereafter effect the beam center reference course Y.

The reference device 10 now generates a positive $(+)E_1$ signal which is simultaneously applied (1) through line 14 to cause the signal sensor 15 to operate the switch element 67 of the switch mechanism S-5 so as to maintain the switch element 67 in the open position shown until the signal $E_1$ decreases below a predetermined value, as hereinafter explained, (2) signal $E_1$ is also applied through line 17 to drive synchronizer-integrator device 32; and (3) signal $E_1$ is further applied through line 12 to summing point B to cause a control signal to be applied to the flight control system 52.

The flight control system 52 thereupon institutes a command signal through line 53 to the control device 54 which is arranged so as to appropriately cause aircraft 56 to assume a condition relative to the course reference X such that the bias device 47 generates a negative $(-)$ signal $E_2$ which is applied through line 49 to summing point B. As the controlled aircraft 56 begins to approach the beam center reference Y to which the device 10 is controlling, the signal $E_1$ applied to the line 12 decreases and upon the signal $E_1$ decreasing below a predetermined value as upon the aircraft being in a position (P), shown on FIGURE 2, the signal sensor 15 is effective through the operative connection 63–65 to cause solenoid 64 to close switch element 67 of the switch mechanism S-5 which thereupon effectively energizes the null sensor 60 and permits the null sensor 60 to assume authority over switch mechanism S-4 through the operative connection 61 and the solenoid 59.

The controlled aircraft 56 will thereafter continue to approach the beam center course reference Y until signals $E_1(+)$ and $E_2(-)$ are equal in magnitude at summing point B. The magnitude of either of these two signals $E_1$ and $E_2$ is a correction needed to achieve a controlled position in relation to the beam center course reference Y. When the foregoing equality occurs, the aircraft will assume a steady-state displacement from the beam center reference course Y, as at position (Q), shown in FIGURE 2.

Meanwhile, the device 32 has been providing a synchronizer function and has been rapidly following the variation of the signal $E_1$ so as to provide an output signal $E_{1A}$ which acts in opposition to the signal $E_1$ at summing point A. The device 32, however, stops producing the additional output signal $E_{1A}$ when the signal $E_{1A}(-)$ and a steady-state signal $E_1(+)$ are equal in magnitude at the summing point A.

When the sum of signals at point B is zero and remains essentially zero for a predetermined delay period sufficient to avoid transient operation, the null sensor 60 operates as indicated by the line 61 of FIGURE 1 so as to actuate the switch mechanism S-4 and causes the switch element 34 to close the contacts F-G and the operative connection 36 to transfer the mode of operation of the device 32 from that of a synchronizer to that of an integrator. The last-mentioned mode of operation of the switch mechanism S-4 and device 32 is effective after an appropriate time delay, as for example, in the travel of the aircraft 56 from positions Q to R, as indicated in FIGURE 2.

When the switch S-4 is thereafter actuated by the null sensor 60 so as to cause the switch element 34 to close contacts F-G, it is locked in this position by a suitable operator releasable locking mechanism indicated by numeral 70 whereupon there is applied through the switch element 34 the integrator signal $E_{1B}(-)$ to the polarity reversal device 46. A biasing signal $E_{1C}(+)$ then appears at the summing point B of the value equal to and of the same sense as signal $E_1$ so as to in effect cancel the bias signal $E_2$ to cause the controlling signal $E_1$ to then effect the changes in the flight condition of the aircraft necessary to rapidly achieve the beam center reference course Y positon sought by the device 10, as indicated, for example, at S on FIGURE 2.

Thus, the switch mechanism S-4 is actuated by the null sensor 60 in a direction to cause the switch element 34 to close contact F-G while the operation of the device 32 is shifted through the operative connection 36 so as to thereafter function as an integrator which slowly and continuously corrects for minor bias-producing reference errors effected by the bias device 47 so long as a signal $E_1$ is applied to the line 12 by the radio beam responsive device 10 in response to a deviation of the aircraft 56 from the beam center reference course Y, as shown in FIGURE 2. Upon the aircraft reaching the beam center reference course Y, the signal $E_1$ applied to the line 12 by the device 10 will be reduced to zero (null).

From the foregoing, it will be seen that the present invention relates to novel means to accomplish proportional automatic and rapid correction for steady-state errors (bias) which may occur with (a) automatic and (b) semi-automatic flight control systems.

In general, automatic flight control systems are defined as devices which cause an airframe to automatically achieve and maintain one or more pre-established flight references. Specifically, automatic flight control systems include such devices as automatic pilots, couplers, guidance systems, pattern programmers, flight path computers, stall warning systems, throttle systems, and navigational systems, etc.

In general, semi-automatic flight control systems are defined as devices which present visual commands to the operator who controls the flight conditions of the aircraft. The commands are of such a nature as to indicate the amount and direction of correction necessary to achieve and maintain one or more pre-established flight references.

Specifically, semi-automatic flight control systems include such devices as flight directors, zero readers, couplers, throttle control, stall control, pattern programmers, and navigational control.

The disclosed methods utilize intelligence which is a result of characteristics common to all flight control systems, viz, when an existing flight reference conflicts with an additional reference, the airframe will assume a flight condition such that a proportional displacement from both references will be maintained in the absence of bias-cancelling devices. The resulting intelligence is as follows:

(a) A cancellation null is produced by the intelligence generated from the two reference sensors 10 and 47.

(b) The corrective intelligence, necessary to achieve the additional reference, is proportional to the displacement from the additional reference.

(c) The corrective intelligence, necessary to achieve the additional reference, the beam center reference course Y, is proportional to the displacement from the existing reference, the course reference X.

With appropriate switching devices, the desired rapid bias cancellation can be achieved by utilizing integrators, synchronizers, and washouts which can be interconnected in the following manner:

(a) Synchronize to the existing reference, apply the synchronized intelligence to the flight control system, and then integrate the additional reference.

(b) Synchronize to the existing reference, apply the synchronized intelligence to the flight control system, and then apply the additional reference to a washout device.

(c) Synchronize to the additional reference, apply the synchronized intelligence to the flight control system, and then integrate the additional reference.

(d) Synchronize to the additional reference, apply the synchronized intelligence to the flight control system, and then apply the additional reference to a washout device.

In the aforenoted arrangement, there may be utilized a null sensing device 60 which operates appropriate switching. This device incorporates, when necessary, provisions to filter undesirable null-producing transients and further guarantees proper null discrimination by appropriately delaying the desired switching. The null sensing device 60 can also control other switching functions which accomplish the following:

(a) Engage or disengage completely or partially any section of the flight control system.

(b) Gain changing and/or modification of any airframe control parameter.

In the aforenoted arrangement, there may be utilized a deviation sensing device 15 to sense deviations from a desired reference. This device 15 institutes appropriate switching at some predetermined deviation from reference. The switching can control the following:

(a) Operation of the null sensing device 60 described in the previous section above so that when the airframe is programmed, by the action of the flight control system, to close the desired reference in a manner which produces nulls before the reference is achieved, appropriate switching prevents the null sensing device 60 from exerting any authority over its associated switching S-4 until a predetermined deviation from the reference is reached.

(b) Other switching functions which engage or disengage completely or partially any section of the flight control system.

(c) Gain changing and/or modification of any airframe control parameter.

What is claimed is:

1. In a flight control system for a vehicle comprising in combination a first signal generating device for effecting a controlling signal in response to deviation of the vehicle from a first course reference, a second signal generating device for effecting a biasing signal in response to deviation of the vehicle from a second course reference, means for combining said first and second mentioned signals so as to provide a resultant differential signal, means responsive to said resultant differential signal for controlling a course of flight of the vehicle, a third signal generating device operative in response to a signal from said first-mentioned signal device, relay means operable in one sense to selectively connect the output signal from said third device in opposition to the biasing signal from said second device, means responsive to said resultant differential signal for operating said relay means in said one sense upon said differential signal decreasing to a null value, and means for locking said relay means in said one operating sense whereupon the signal applied through said relay means by the third device and in opposition to the biasing signal from said second device renders the first device effective to provide through said combining means a resultant signal for controlling the flight of the vehicle in accordance with said first course reference.

2. The combination defined by claim 1 including a synchronizer-integrator means responsive to the signal from said first signal generating device, null sensor means responsive to the resultant differential signal and effective in response to a null signal condition of said resultant signal to operate the relay means in said one sense so as to render the synchronizer signal from the synchronizer-integrator means ineffective and to operably connect the integrator signal from the synchronizer-integrator means to the signal combining means so as to cancel the biasing signal from the second signal generating device.

3. The combination defined by claim 2 including a signal sensor responsive to the output signal from said first signal generating device to render said null sensor means operatively effective upon said output signal decreasing to within a predetermined range.

4. In a flight control system for a vehicle comprising in combination a first device responsive to an initial course reference for generating a signal, a second device responsive to another course reference extending parallel to the first course reference for generating a second signal, first means for summing the signals from the first and second devices so as to provide a resultant differential signal, a polarity reversal means for applying a signal to the summing device in opposition to the signal from the second-mentioned signal means, means operative in response to the signal from the first device for applying an integrator signal to the polarity reversal means for causing said polarity reversal means to apply said opposing signal to said summing device, means for selectively controlling the application of said integrator signal to said polarity reversal means, and a null sensor responsive to said resultant differential signal for operating said control means.

5. The combination defined by claim 4 including a signal sensor responsive to the output from the first signal device, means for controlling the operation of the null sensor, and said last-mentioned means being operatively controlled by said signal sensor upon a signal from the first signal generating device decreasing below a predetermined value whereupon the vehicle assumes a steady-state displacement from the initial course reference.

6. A control system comprising a first condition sensing device for effecting a main reference signal, a second condition sensing device for effecting a biasing signal, means for summing the reference signal and the biasing signal so as to provide a resultant controlling signal, other means responsive to said main reference signal for applying a second biasing signal acting in opposition to said first biasing signal, a null sensor responsive to said resultant controlling signal for rendering said second biasing signal effective upon the resulting signal being at a null value whereupon said second biasing signal tends to cancel said first biasing signal so that said main reference signal may be effective through said summing device to increase the resultant controlling signal above the null value.

7. The combination defined by claim 6 including a signal sensor device responsive to the main reference signal for rendering the null sensor effective under predetermined operating conditions.

8. The combination defined by claim 7 including operator-operative means for rendering the first condition sensing device and the signal sensor device operative.

9. The combination defined by claim 6 including a device alternatively operable as a synchronizer and an integrator, said synchronizer-integrator device being responsive to the main reference signal effected by said first condition sensing device, and means operably connecting said null sensor to said synchronizer-integrator device whereby the synchronizer-integrator device is rendered effective by said null sensor device to apply said second biasing signal to said summing device upon the resultant controlling signal being at a null value for a predetermined delay period.

References Cited by the Examiner

UNITED STATES PATENTS 3,038,156  6/1962  Osder _____ 244—77

ORIS L. RADER, *Primary Examiner.*

JOHN F. COUCH, *Examiner.*

T. LYNCH, *Assistant Examiner.*